(12) United States Patent
Fukasawa

(10) Patent No.: US 7,263,704 B2
(45) Date of Patent: Aug. 28, 2007

(54) DISK CLAMPER AND METHOD OF ASSEMBLING THE SAME

(75) Inventor: Akihiro Fukasawa, Kyoto (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 15 days.

(21) Appl. No.: 10/512,481

(22) PCT Filed: Sep. 16, 2003

(86) PCT No.: PCT/JP03/11779

§ 371 (c)(1),
(2), (4) Date: Oct. 26, 2004

(87) PCT Pub. No.: WO2004/053863

PCT Pub. Date: Jun. 24, 2004

(65) Prior Publication Data

US 2005/0223401 A1    Oct. 6, 2005

(30) Foreign Application Priority Data

Dec. 6, 2002    (JP) .............................. 2002-354917

(51) Int. Cl.
*G11B 17/028* (2006.01)
*G11B 17/03* (2006.01)
*G11B 19/20* (2006.01)

(52) U.S. Cl. ...................... 720/706; 720/710
(58) Field of Classification Search ................ 720/706, 720/707, 709, 710, 711, 712, 713, 714
See application file for complete search history.

(56) References Cited

U.S. PATENT DOCUMENTS 4,982,399 A * 1/1991 Odawara et al. ............ 720/710
5,761,186 A * 6/1998 Mushika et al. ............ 720/704
5,933,408 A * 8/1999 Park et al. .................. 720/706
6,160,780 A * 12/2000 Furukawa et al. .......... 720/604

(Continued)

FOREIGN PATENT DOCUMENTS

JP    10-308047 A    11/1998

(Continued)

*Primary Examiner*—Wayne Young
*Assistant Examiner*—Mathew G. Kayrish
(74) *Attorney, Agent, or Firm*—Birch, Stewart, Kolasch & Birch, LLP

(57) ABSTRACT

A disk clamper (100) includes a clamper main body (1) and a lid body (2) that holds an attraction member (3) such as a magnet or the like between the clam main body (1) and the lid body (2). The clamper main body (1) includes a peripheral wall (12) whose outer peripheral surface constitutes a cylindrical surface. The lid body (2) includes a peripheral wall (22) fitted on the outside of the peripheral wall (12) of the clamper main body (1). Engaging claws (13) are formed on and protruded from the outer peripheral surface of the peripheral wall (12). Engaging claws (23) are formed on the inner peripheral surface of the peripheral wall (22). The clamper main body (1) and the lid body (2) can be integrated by fitting the peripheral wall (22) to the outside of the peripheral wall (12) in a state where the circumferential positions of the engaging claws. (13, 23) are different from each other, and by rotating the peripheral walls (12, 22) relative to each other until the engaging members (13, 23) engage each other in the axial direction.

13 Claims, 13 Drawing Sheets

U.S. PATENT DOCUMENTS

| | | | |
|---|---|---|---|
| 6,163,520 A * | 12/2000 | Kobayashi et al. | 720/710 |
| 6,845,511 B2 * | 1/2005 | Kuo et al. | 720/706 |
| 7,036,135 B2 * | 4/2006 | Hsu et al. | 720/707 |
| 2002/0044521 A1 * | 4/2002 | Sogawa et al. | 369/270 |
| 2003/0133399 A1 * | 7/2003 | Chuang et al. | 369/270 |

FOREIGN PATENT DOCUMENTS

| | | |
|---|---|---|
| JP | 3099729 U | 7/1999 |
| JP | 2001-143345 A | 5/2001 |

\* cited by examiner

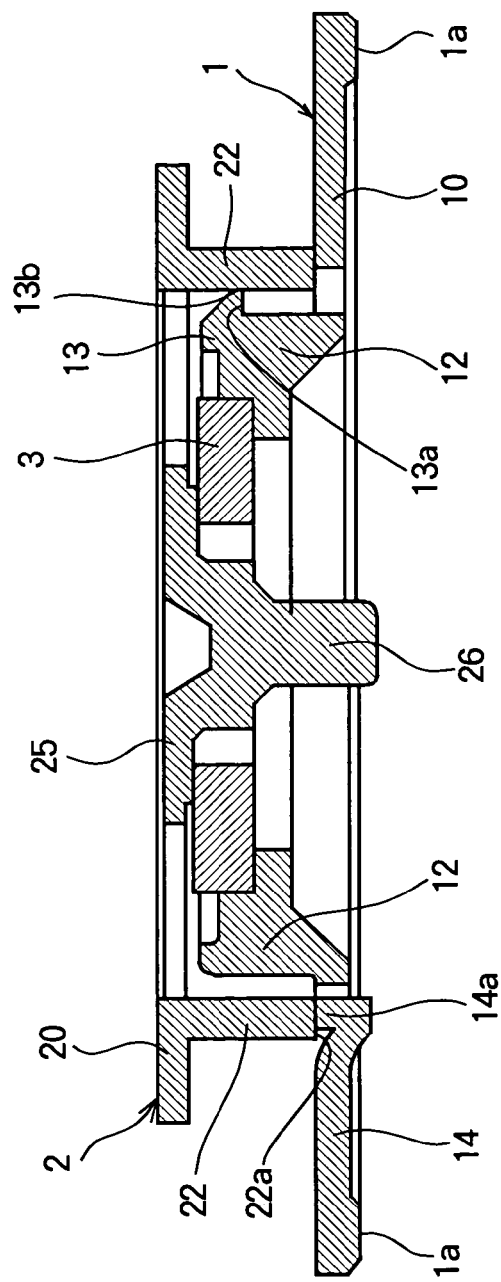
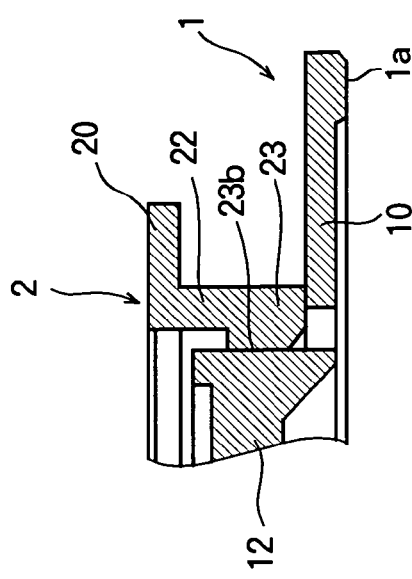
FIG.11 (a)
FIG.11 (b)

DISK CLAMPER AND METHOD OF ASSEMBLING THE SAME

TECHNICAL FIELD

This invention relates to a disk clamper that holds a disk (such as a compact disk) between the disk clamper and a turntable to thereby rotate the disk, and relates to an assembling method of the disk clamper.

BACKGROUND ART

A disk clamper has an internal magnet for attracting a magnetic body or the like mounted on a turntable, in order that the disk clamper and the turntable hold the disk by sandwiching the disk therebetween. Therefore, the disk clamper is so constructed that a clamper main body and a lid body hold the magnet or the like therebetween. Such a disk clamper is disclosed in Japanese Laid-Open Patent Publication No. 10-308047 (pages 3 to 4 and FIG. 1).

In the conventional disk clamper, a cylindrical member (a lid cylinder) provided on the lid body is fitted to the inside of a cylindrical member (a holding cylinder) provided on the clamper main body. Claws are integrally formed on a cylindrical wall of the lid cylinder, and the claws are deformable in the radial direction of the lid cylinder. The holding cylinder has engaging holes that engage the tips of the claws. In order to assemble the disk clamper, the lid cylinder is pushed into the inside of the holding cylinder in the axial direction. In this state, the claws of the holding cylinder first deform inwardly, and then engage the engaging holes of the holding cylinder. Because of the engagement of the claws and the engaging holes, the clamper main body and the lid body are integrated with each other.

Recently, in order to meet the demand for a thinner disk drive device, the lengths of the claws are set to approximately from 3 mm to 4 mm. If the lengths of the claws are short as above, large stresses are generated at the bases of the claws when the claws deform. In order to reduce the stresses at the bases of the claws to less than or equal to the allowable stress of component material (plastic), the claws are made thin, or the amounts of the deformations of the claws are reduced (i.e., the claws and the engaging holes slightly engage with each other).

However, if the thicknesses of the claws are made thin, or if the claws and the engaging holes slightly engage each other, it is not possible to obtain a sufficient coupling strength between the clamper main body and the lid body. Therefore, if an impact force is applied to the clamper main body and the lid body in the direction in which the clamper main body and the lid body separate from each other when the disk drive device is dropped or the like, the claws may be damaged or the claws may disengage from the engaging hole, with the result that the lid body and the clamper main body may separate from each other and may dropped from the turntable.

Moreover, for the disk clamper, it is required that the performance does not vary even if the assembling and disassembling of the disk clamper are repeated. However, when the disk clamper is disassembled, there is a possibility that the claws may be excessively deformed so that the claws may be broken at the bases thereof.

DISCLOSURE OF THE INVENTION

The present invention is intended to solve the above described problems, and an object of the present invention is to provide a disk clamper and an assembling method thereof capable of enhancing the coupling strength between a clamper main body and a lid body, and preventing the separation of the main body and the lid body even when the impact force is applied because of the dropping or the like.

According to the invention, there is provided a disk clamper comprising a clamper main body including a base portion having a contact surface that contacts a disk, and a first peripheral wall provided on a side of said base portion opposite to said contact surface, and a lid body including a second peripheral wall attached to the inside or outside of said first peripheral wall, and an attraction member made of a magnet or a magnetic body held in the inside of said first or second peripheral wall. One peripheral wall of said first and second peripheral walls has a peripheral surface substantially in the shape of a cylindrical surface, and the other peripheral wall contacts said peripheral surface to thereby be fitted to the inside or outside of said one peripheral wall. Said first and second peripheral walls respectively have first and second engaging members that engage each other in an axial direction of said peripheral surface when said first and second peripheral walls are in predetermined relative positions in a circumferential direction of said peripheral surface.

One of the first and second peripheral walls is fitted to the outside or inside of the other, and the first and second engaging members engage each other in the axial direction when the first and second peripheral walls are in the predetermined relative positions. Therefore, the clamper main body and the lid body can be integrated by fitting the first and second peripheral walls to each other in a state where the circumferential positions of the first and second engaging members are different from each other, and by rotating the first and second peripheral walls relative to each other until the first and second engaging members engage each other. Because it is not necessary to resiliently deform the first and second engaging claws, it is possible to increase the mating surfaces of the first and second engaging claws and therefore the engagement therebetween is not easily released. Further, it is also possible to increase the thicknesses of the first and second peripheral walls so as to restrict the deformations of first and second peripheral walls. Thus, it is possible to enhance the coupling strength between the clamper main body and the lid body, and therefore it is possible to prevent the separation of the clamper main body and the lid body even when the impact force is applied to the disk drive device due to the dropping of the disk drive device or the like.

BRIEF DESCRIPTION OF THE DRAWINGS

FIGS. 11(*a*) and (*b*) are enlarged sectional views illustrating the sectional structure of the disk clamper according to Embodiment 1 of the present invention;

BEST MODE FOR CARRYING OUT THE INVENTION

The best mode for carrying out the invention will be described concretely.

Embodiment 1.

Figure 1:
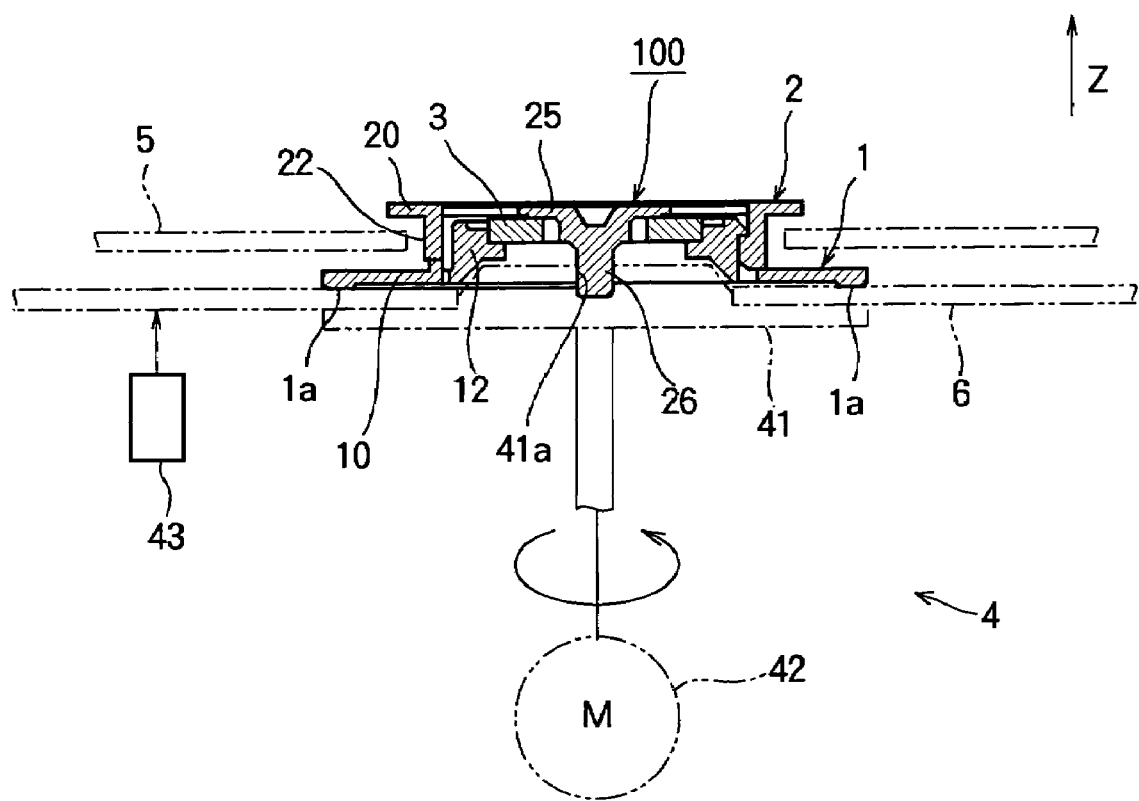
FIG. 1 is a sectional view illustrating a state where a disk clamper according to Embodiment 1 of the present invention is used in a disk drive device.

FIG. 1 is a schematic view of a disk drive device on which a disk clamper 100 according to Embodiment 1 of the present invention is mounted. The disk drive device includes a turntable 41 on which a disk 6 is placed, a spindle motor 42 for rotating the turntable 41, and a pickup 43 for writing information on and/or reading information from the disk 6. The disk clamper 100 holds the disk 6 so that the disk clamper 100 and the turntable 41 sandwich the disk 6 therebetween.

Figure 2A:
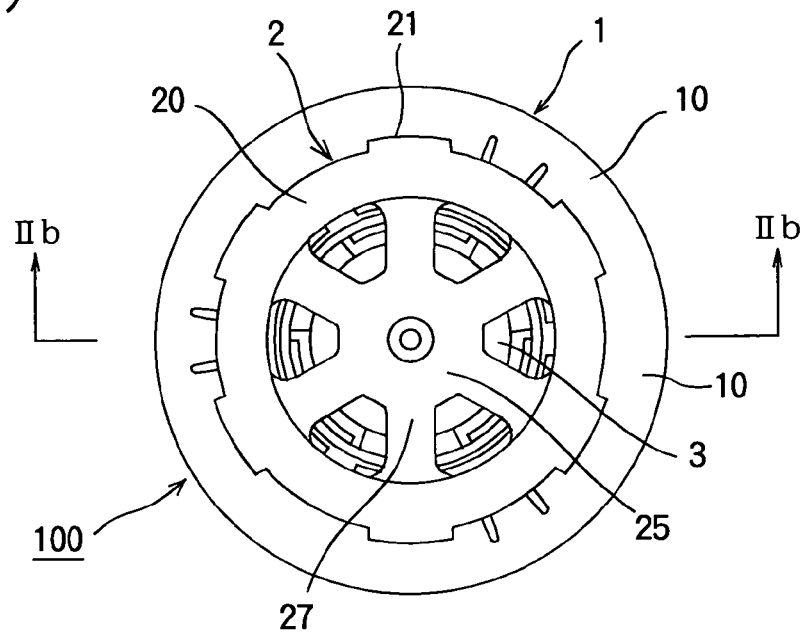
FIGS. 2(a), (b) and (c) are a plan view, a sectional view taken along line IIb-IIb, and a bottom view of the disk clamper according to Embodiment 1 of the present invention.
Figure 2B:
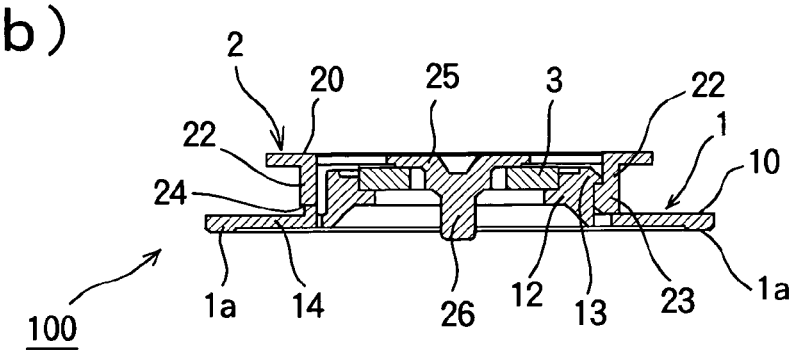
Figure 2C:
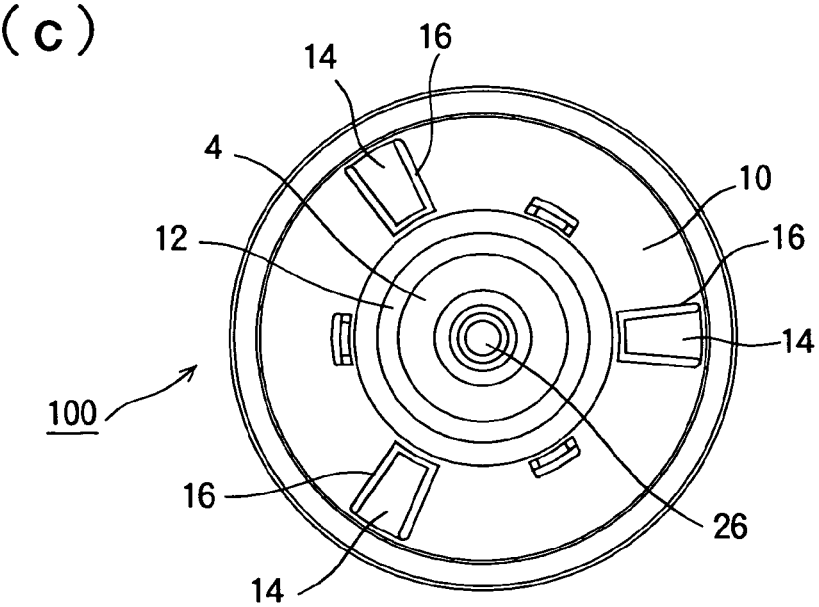

FIG. 2(*a*) is a plan view of the disk clamper 100. FIG. 2(*b*) is a sectional view taken along line IIb-IIb in FIG. 2(*a*). FIG. 2(*c*) is a bottom view of the disk clamper 100. As shown in FIGS. 2(*a*) through (*c*), the disk clamper 100 includes a clamper main body 1 having a disk contact surface 1*a* that contacts the surface of the disk 6, and a lid body 2 attached to the clamper main body 1. A ring-shaped attraction member 3 is held between the clamper main body 1 and the lid body 2.

Figure 3A:
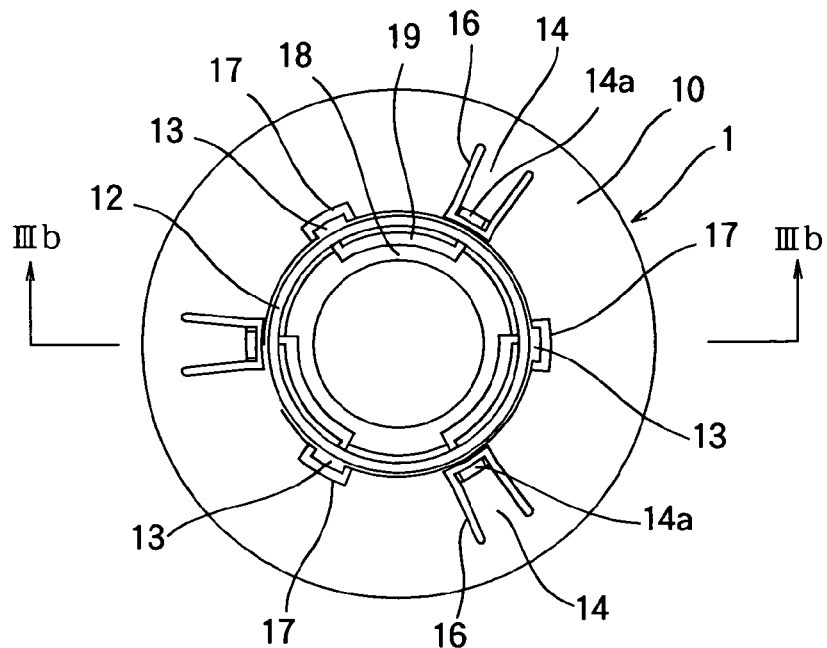
FIGS. 3(a), (b) and (c) are a plan view, a sectional view taken along line IIIb-IIIb, and a bottom view of the disk clamper according to Embodiment 1 of the present invention.
Figure 3B:
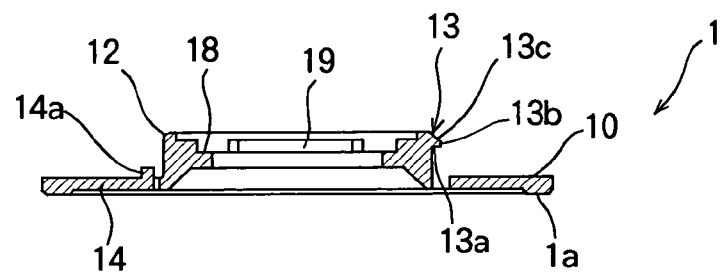
Figure 3C:
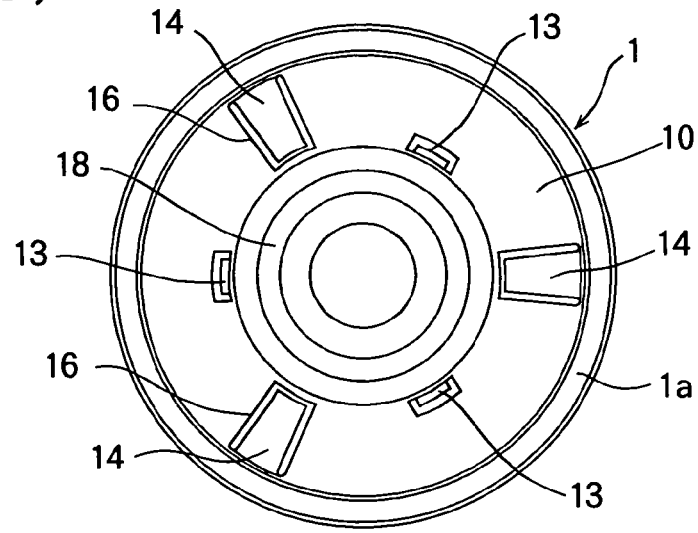
Figure 4:
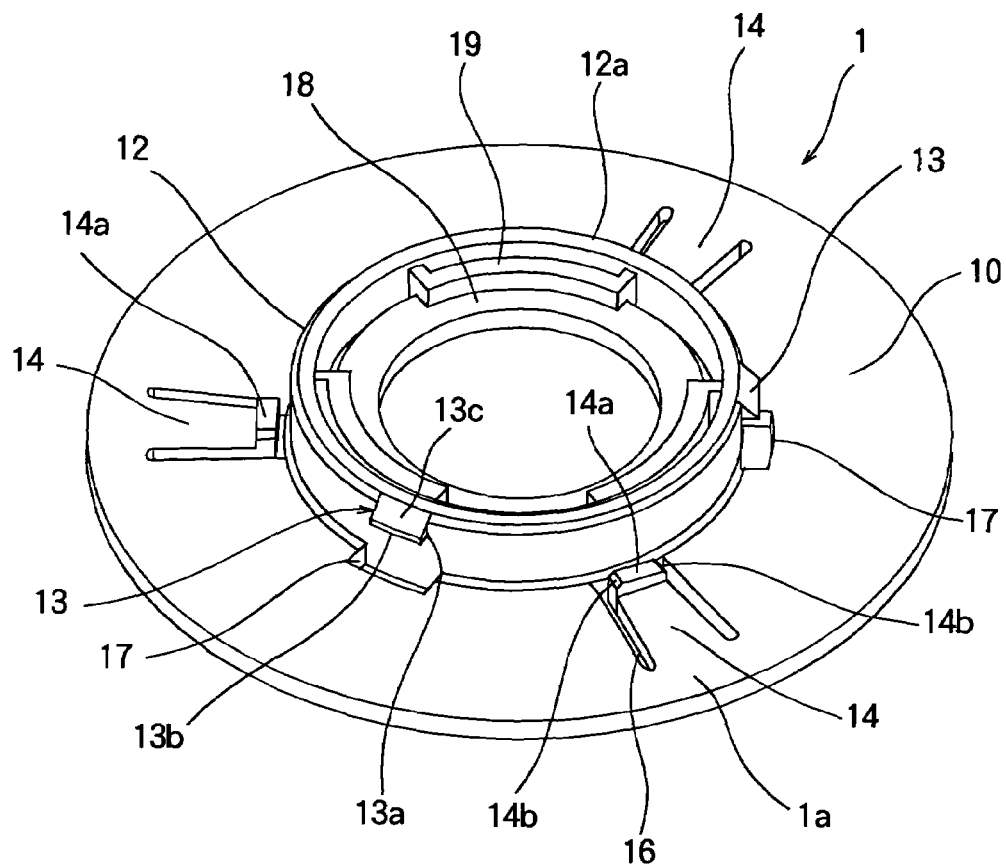
FIG. 4 is a perspective view of a clamper main body according to Embodiment 1 of the present invention.

FIG. 3(*a*) is a plan view of the clamper main body 1. FIG. 3(*b*) is a sectional view taken along line IIIb-IIIb in FIG. 3(*a*). FIG. 3(*c*) is a bottom view of the clamper main body 1. FIG. 4 is a perspective view of the clamper main body 1. As shown in FIGS. 3(*a*) through (*c*), the clamper main body 1 includes a ring-shaped base portion 10 on which the above-described disk contact surface 1*a* is formed. The disk contact surface 1*a* is a flat surface formed on the bottom of the base portion 10, and the disk contact surface 1*a* extends along the outer periphery of the base portion 10 with a constant width. A cylindrical peripheral wall 12 is unitarily formed on the inner periphery of the base portion 10 and protrudes upward, i.e., in the direction opposite to the disk contact surface 1*a* side. Outer and inner peripheral surfaces of the peripheral wall 12 are cylindrical surfaces having a common center axis perpendicular to the disk contact surface 1*a*. Hereinafter, the direction of this center axis is referred to as "axial direction".

Three engaging claws 13 are formed on the outer peripheral surface of the peripheral wall 12, and protrude outward from the peripheral wall 12. The three engaging claws 13 are evenly spaced in the circumferential direction of the peripheral wall 12. Each engaging claw 13 is elongated in the circumferential direction of the peripheral wall 12 rather than in the axial direction of the peripheral wall 12. Each engaging claw 13 is formed on the top end of the peripheral wall 12, i.e., an end in the axial direction of the peripheral wall 12 opposite to the base portion 10 side. The lower surface (referred to as a horizontal mating surface) 13*a* of each engaging claw 13, i.e., an end surface of the base portion 10 side of each engaging claw 13, is parallel to the disk contact surface 1*a*. An outer peripheral end surface 13*b* that extends upward from the periphery of each horizontal mating surface 13*a* constitutes a part of a cylindrical surface. An inclined surface 13*c* is continuously formed on the upper end of each outer peripheral end surface 13*b*, and is so inclined that the protruding amount from the peripheral wall 12 increases as the distance to the base portion 10 decreases.

A ring-shaped holding portion 18 is formed on the inner side of the peripheral wall 12 for holding an attraction member 3. Three arc-shaped portions 19 are formed on the upper surface of the holding portion 18. The three arc-shaped portions 19 are evenly spaced in the circumferential direction of the peripheral wall 12. Each arc-shaped portion 19 arcuately extends along the inner peripheral surface of the peripheral wall 12, and both ends of each arc-shaped portion 19 are fixed to the inner surface of the peripheral wall 12.

As shown in FIG. 4, three resiliently deformable locking claws (i.e., resilient members) 14 are formed on the base portion 10. The three locking claws 14 are evenly spaced in the circumferential direction of the base portion 10. Each locking claw 14 has a substantially rectangular shape elongated in the radial direction of the base portion 10. Three sides of each locking claw 14 (other than the outer periphery side of each locking claw 14) are surrounded by a slit 16. In other words, each locking claw 14 is deformable in such a manner that the amount of the deformation of the locking claw 14 is the largest at the inner end thereof. An upward projection 14*a* is formed on the inner end of each locking claw 14. Inclined surfaces 14*b* are formed at both ends of each projection 14*a* in the circumferential direction. Three openings 17 are formed on the base portion 10. The openings 17 are provided for preventing the undercut when the clamper main body 1 is integrally molded using a plastic material.

Figure 5A:
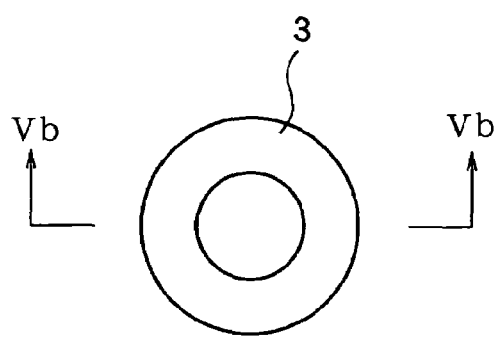
FIGS. 5(a) and (b) are a plan view and a sectional view taken along line Vb-Vb of an attraction member according to Embodiment 1 of the present invention.
Figure 5B:

FIG. 5(*a*) is a plan view of the attraction member 3. FIG. 5(*b*) is a sectional view taken along line Vb-Vb in FIG. 5(*a*). The attraction member 3 is a ring-shaped member made of a magnet or a magnetic body (a so-called attractable sheet metal). The attraction member 3 is placed on the holding portion 18 (FIG. 4) of the clamper main body 1 so that the attraction member 3 is surrounded by the arc-shaped portions 19 (FIG. 4).

Figure 6A:
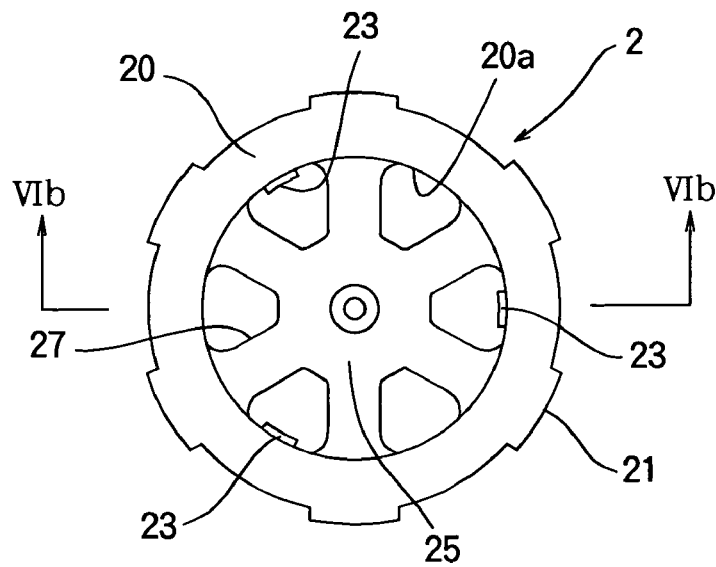
FIGS. 6(*a*), (*b*) and (*c*) are a plan view, a sectional view taken along line VIb-VIb, and a bottom view of a lid body according to Embodiment 1 of the present invention.
Figure 6B:
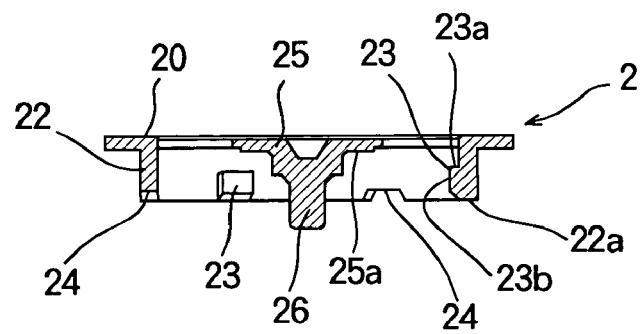
Figure 6C:
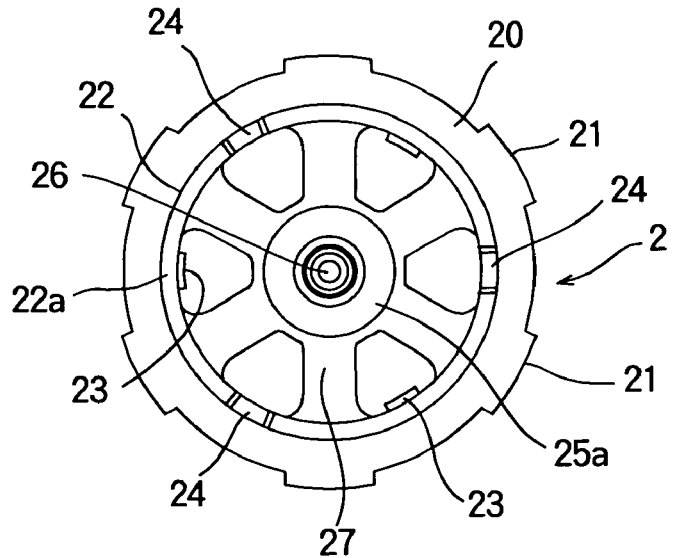
Figure 7:
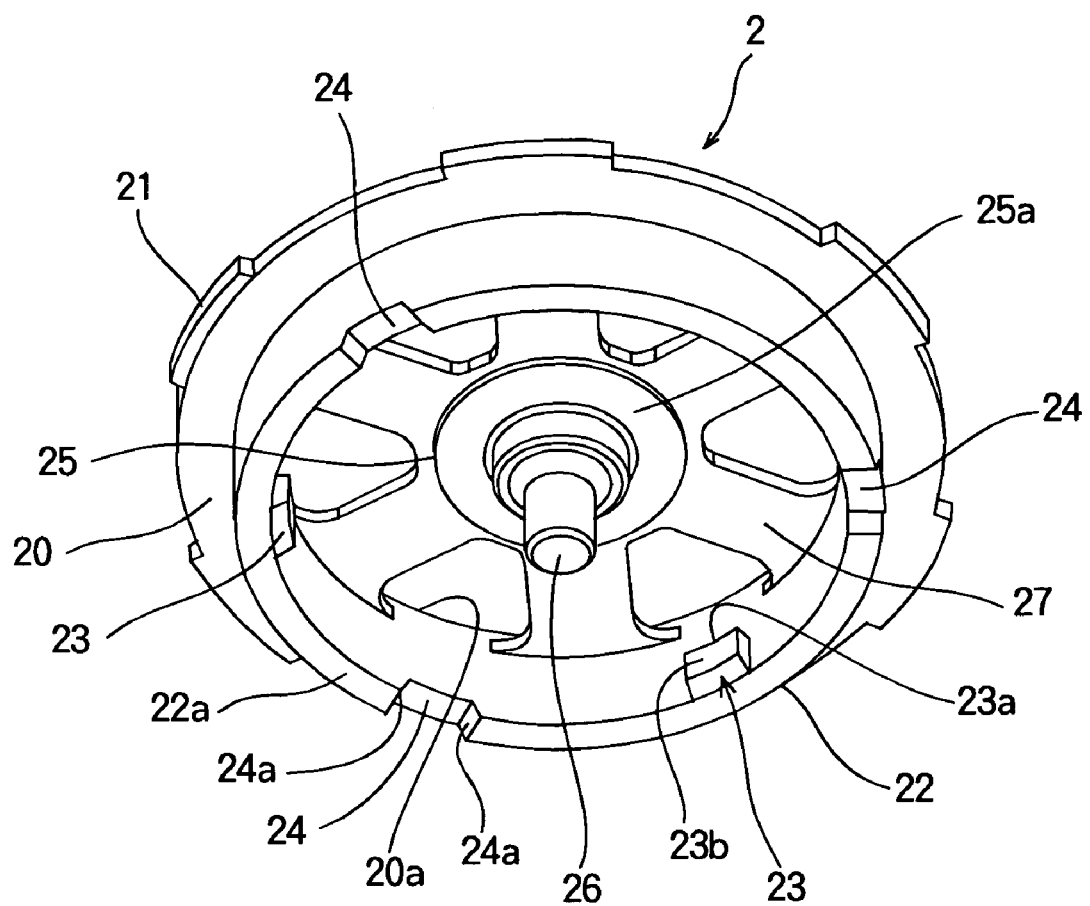
FIG. 7 is a perspective view of a lid body according to Embodiment 1 of the present invention.

FIG. 6(*a*) is a plan view of the lid body 2. FIG. 6(*b*) is a sectional view taken along line VIb-VIb in FIG. 6(*a*). FIG. 6(*c*) is a bottom view of the lid body 2. FIG. 7 is a perspective view of the lid body 2 as seen from below. As shown in FIGS. 6(*a*) through (*c*), the lid body 2 has a ring-shaped portion 20. Six convex portions 21 are formed on the outer peripheral surface of the ring-shaped portion 20. The six convex portions 21 are evenly spaced in the circumferential direction of the ring-shaped portion 20. A center support portion 25 is formed on the inner side of the ring-shaped portion 20, and has a shaft-shaped projection 26 that projects downward, i.e., toward the clamper main body 1 (FIG. 4). The center support portion 25 and the ring-shaped portion 20 are connected to each other by six arm portions 27 formed in an opening 20a in a radial manner. The center support portion 25 has a retaining surface 25a that contacts the attraction member 3 held on the holding portion 18 (FIG. 4) of the clamper main body 1. The projection 26 is inserted into a hole 41a (FIG. 1) formed on a rotation center of the turntable 41.

As shown in FIG. 7, a cylindrical peripheral wall 22 are unitarily formed on the inner periphery of the ring-shaped portion 20, and protrudes downward. Outer and inner peripheral surfaces of the peripheral wall 22 are cylindrical surfaces each of which has a center axis aligned on the center axis of the projection 26. Three engaging claws 23 are formed on the inner peripheral surface of the peripheral wall 22 and protrude inwardly. The three engaging claws 23 are formed at the lower end of the peripheral wall 22 (i.e., an end of the peripheral wall 22 opposite to the ring-shaped portion 20 side in the axial direction), and are evenly spaced in the circumferential direction of the peripheral wall 22. Each engaging claw 23 is elongated in the circumferential direction of the peripheral wall 22 rather than the axial direction of the peripheral wall 22. An inner peripheral end surface 23b of each engaging claw 23 constitute a part of the cylindrical surface substantially aligned with the outer peripheral surface of the peripheral wall 12 of the clamper main body 1. An end surface (referred to as a horizontal mating surface) 23a formed on the ring-shaped portion 20 side of each engaging claw 23 is parallel to the disk contact surface 1a. The above described outer peripheral end surface 13b of each engaging claw 13 (FIG. 4) constitutes a part of the cylindrical surface substantially aligned with the inner peripheral surface of the peripheral wall 22.

Three grooves 24 are formed on the bottom surface 22a of the peripheral wall 22. The grooves 24 are evenly spaced in the circumferential direction of the peripheral wall 22 so that the grooves 24 are able to face the projections 14a (FIG. 4) of the locking claws 14 of the clamper main body 1. Each groove 24 has inclined surfaces 24a at both ends thereof in the circumferential direction of the peripheral wall 22 so that the length of each groove 24 (the dimension in the circumferential direction of the peripheral wall 22) decreases as the distance to the bottom of the groove 24 decreases.

Figure 8:
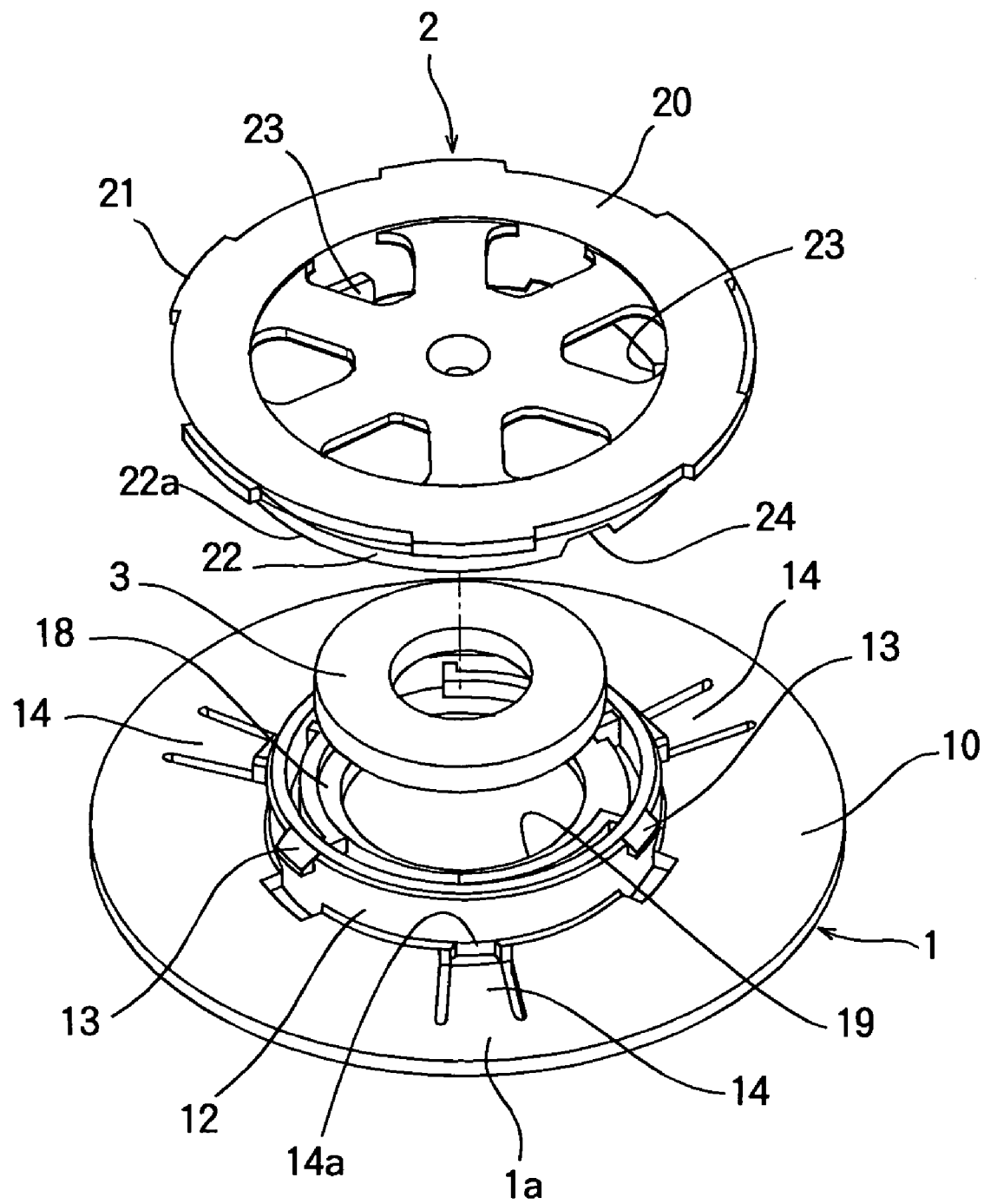
FIG. 8 is an exploded perspective view of the disk clamper according to Embodiment 1 of the present invention.
Figure 9:
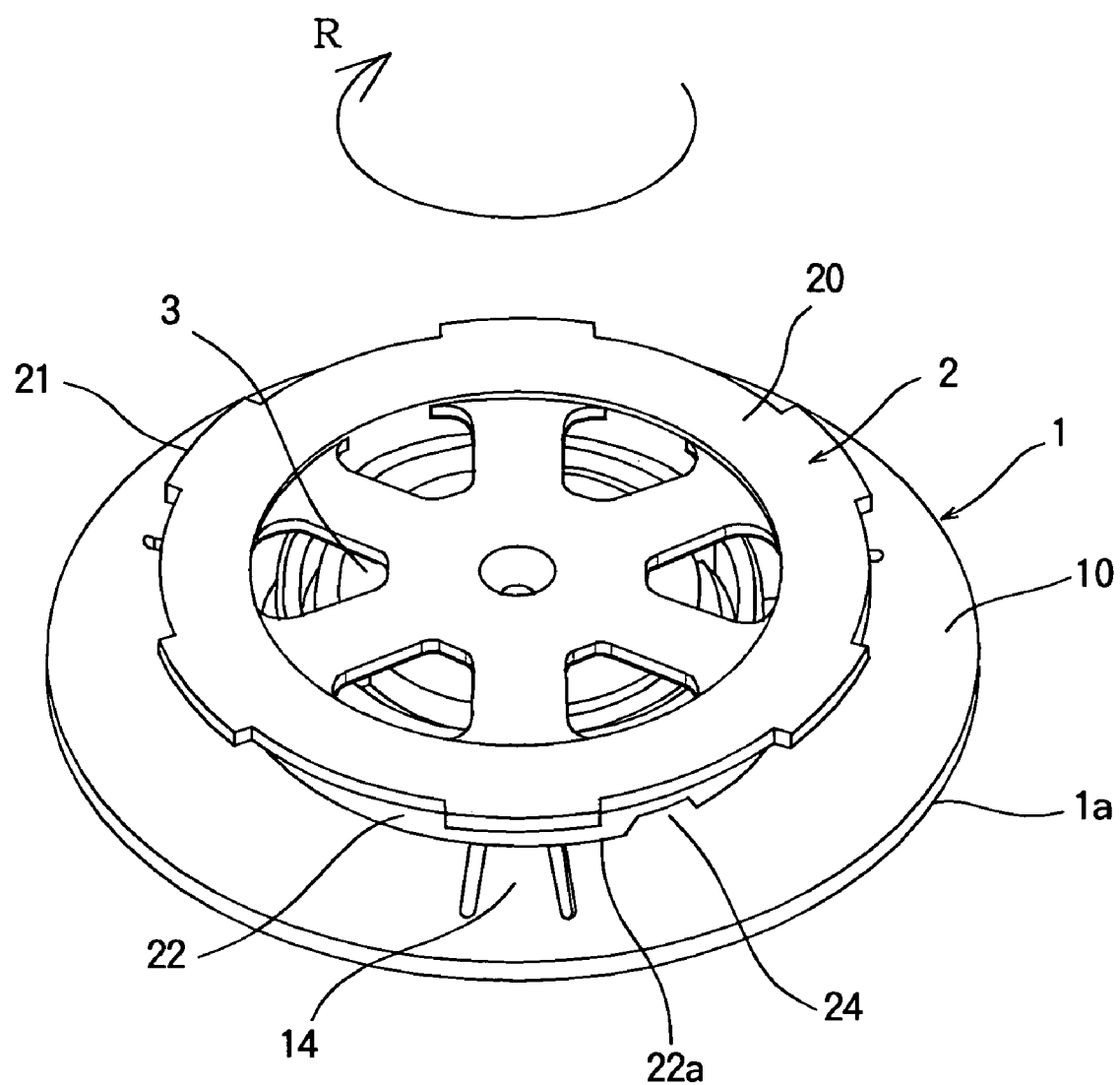
FIG. 9 is a perspective view of the disk clamper during the integrating process of the disk clamper.
Figure 10:
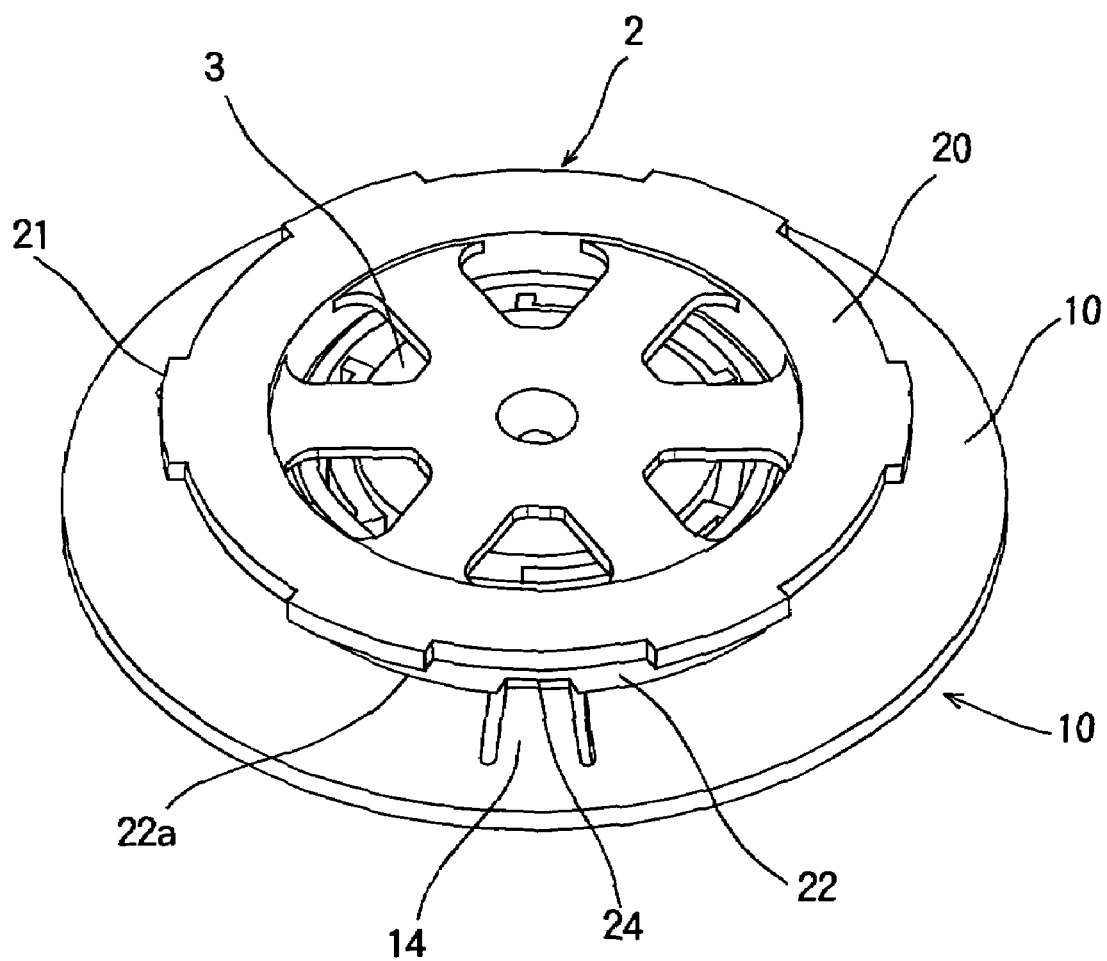
FIG. 10 is a perspective view of the disk clamper in a state where the disk clamper has been integrated.

Next, the assembling method of the disk clamper 100 will be described. FIGS. 8 through 10 are perspective views illustrating the assembling method of the disk clamper 100. In order to assemble the disk clamper 100, the attraction member 3 is inserted into the inside of the peripheral wall 12 of the clamper main body 1 and placed on the holding portion 18 as shown in FIG. 8. Then, in a state where the relative positions of the engaging claws 13 of the clamper main body 1 differ from the engaging claws 23 of the lid body 2 in the circumferential direction, the peripheral wall 22 of the lid body 2 is fitted on the outside of the peripheral wall 12 of the clamper main body 1 in the axial direction. The bottom surface 22a of the peripheral wall 22 of the lid body 2 contacts the upper surface (a surface opposite to the disk contact surface 1a) of the base portion 10 of the clamper main body 1, and simultaneously causes the locking claws 14 of the clamper main body 1 to deform. As a result, a condition shown in FIG. 9 and the left part of FIG. 11(a) is obtained. Moreover, the outer peripheral end surface 13b of the engaging claw 13 contacts the inner peripheral surface of the peripheral wall 22 of the lid body 2 as shown in the right part of FIG. 11(a) in an enlarged scale, or the inner peripheral end surface 23b of the engaging claw 23 contacts the outer peripheral surface of the peripheral wall 12 as shown in FIG. 11(b) in an enlarged scale. As a result, the clamper main body 1 and the lid body 2 are coupled with each other so that the clamper main body 1 and the lid body 2 are able to rotate relative to each other.

Figure 12:
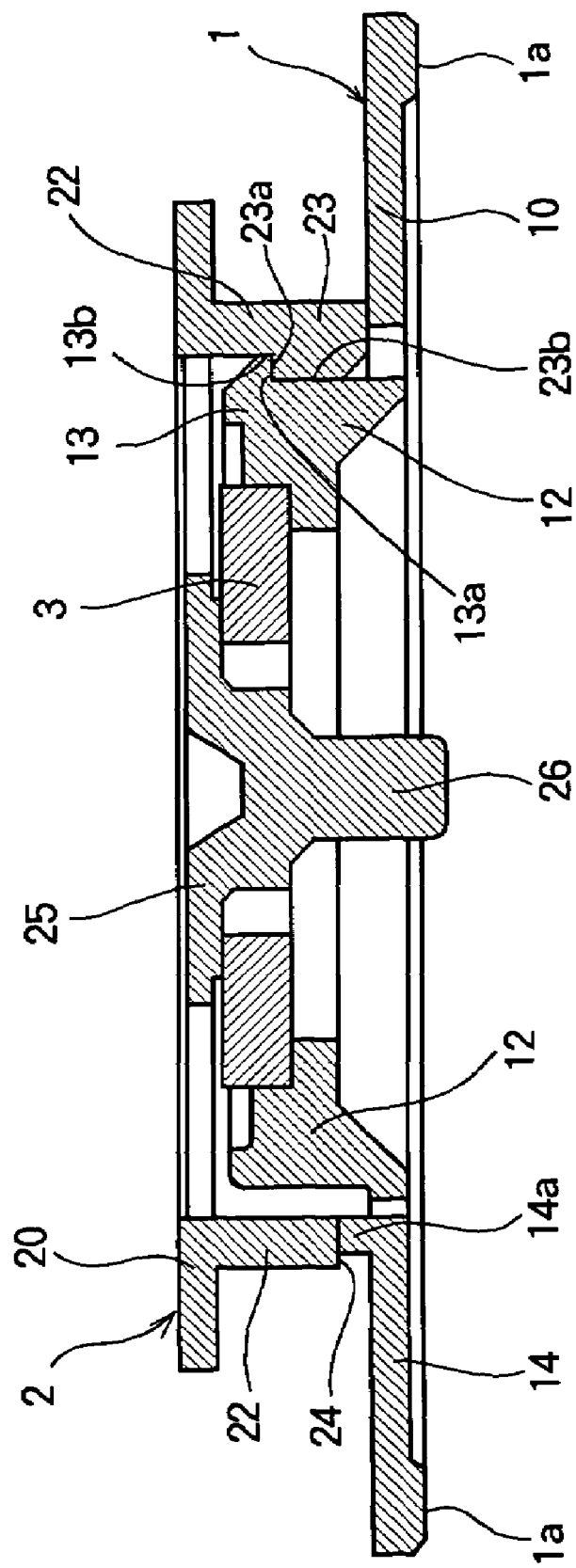
FIG. 12 is a sectional view illustrating the function of the respective engaging claws of the disk clamper according to Embodiment 1 of the present invention.

Next, the lid body 2 is rotated in the direction indicated by an arrow R in FIG. 9 or in the opposite direction. When the lid body 2 is rotated until the locking claws 14 engage the grooves 24, a condition shown in FIGS. 10 and 12 is obtained. As shown in FIG. 12 in an enlarged scale, the horizontal mating surfaces 13a of the engaging claws 13 of the clamper main body 1 and the horizontal mating surfaces 23a of the engaging claws 23 of the lid body 2 mate with each other in the axial direction. Thus, the clamper main body 1 and the lid body 2 lock each other in the circumferential direction because of the engagement of the locking claws 14 and the grooves 24, and are fixed to each other in the axial direction because of the engagement of the engaging claws 13 and 23. As a result, the clamper main body 1 and the lid body 2 are integrated with each other, with the attraction member 3 held therebetween. With this, the assembling of the disk clamper 100 is completed.

In the above described assembling process of the disk clamper 100, when the clamper main body 1 and the lid body 2 are integrated with each other, a disk clamper holder 5 (FIG. 1) is placed between the clamper main body 1 and the lid body 2. The disk clamper holder 5 is provided for holding the disk clamper 100.

In order to disassemble the disk clamper 100, a force greater than a predetermined value is applied to the lid body 2 in the direction in which the lid body 2 is rotated from the state shown in FIG. 10. Because of the sliding of the inclined surfaces 24a (FIG. 7) of the grooves 24 of the lid body 2 and the inclined surfaces 14a (FIG. 4) of the locking claws 14, the locking claws 14 resiliently deform and disengage from the grooves 24 of the lid body 2 so that the lid body 2 is enabled to rotate. By rotating the lid body 2, the engagement between the engaging claws 13 of the clam main body 1 and the engaging claws 23 of the lid body 2 is released, and therefore it becomes possible to separate the lid body 2 from the clamper main body 1 in the axial direction. After the lid body 2 is separated from the clamper main body 1, the attraction member 3 accommodated in the inside of the peripheral wall 12 of the claim main body 1 is taken out. With this, the disassembling of the disk clamper 100 is completed.

In the assembling and disassembling processes of the disk clamper 100, in order to rotate the lid body 2 with respect to the clamper main body 1, an operator can hold the contact surface 1a of the base portion 10 of the clamper main body 1 with one finger, and put another finger on the convex portion 21 of the outer periphery of the lid body 2 to apply force in the rotational direction. As the force is applied by the engagement (friction) between the finger and the convex portion 21, it is possible to lessen the labor of the integration caused by the slippage of the finger, with the result that the assembling can be easily performed in a relatively short time period.

Next, the function of the disk clamper 100 in the disk drive device will be described with reference to FIG. 1. The disk 6 is loaded by a disk loading mechanism (not shown) from a position outside the disk drive device to a position above the turntable 41. In this state, the disk clamper holder 5 contacts the ring-shaped portion 20 of the lid body 2 of the disk clamper 100 from below, and holds the disk clamper 100 at a height so that the disk clamper 100 does not interfere with the disk 6 being loaded. When the disk 6 reaches the position above the turntable 41, the turntable 41 moves upward by a disk clamp mechanism (not shown), or the disk clamper holder 5 moves downward. Thus, the disk contact surface 1a of the disk clamper 100 contacts the upper surface of the disk 6, and the lid body 2 separates from the disk clamper holder 5 upward. Further, because of the magnetic attractive force between the attraction member 3 in the disk clamper 100 and the attractable sheet metal made of the magnetic material (or the magnet) on the turntable 41, the disk clamper 100 is attracted by the turntable 41 with the disk 6 sandwiched therebetween. The projection 26 of the disk clamper 100 is fitted in a hole 41a formed on a rotation center of the turntable 41. When the spindle motor 42 connected to the turntable 41 rotates, the turntable 41, the disk clamper 100 and the disk 6 rotate together with each other. In this state, the writing or reading of the signal on the disk 6 is performed by the pickup 43. The rotation center of the disk clamper 100 is aligned with a center axis of the projection 26 and center axis of the peripheral walls 12 and 22.

In the disk drive device, the turntable 41, the spindle motor 42 and the pickup 43 or the like are mounted on a recording and reproducing unit 4. The recording and reproducing unit 4 is resiliently supported by a rubber clamper or the like (a floating support) for enhancing a vibration tolerance. When the disk drive device is dropped in the direction indicated by an arrow Z in FIG. 1 (i.e., in the direction in which the lid body 2 side directs downward) an impact force applied to the disk clamper 100 via the turntable 41 reaches tens of weight of the recording and reproducing unit 4. When the resiliently supported turntable 41 shifts in the Z direction, the disk clamper 100 also shifts in the Z direction, and the base portion 10 of the clamper main body 1 abuts against the disk clamper holder 5. While the shifting of the clamper main body 1 in the Z direction is restricted by the disk clamper holder 5, the lid body 2 is still urged by the turn table 41 and the attraction member 3 in Z direction, with the result that a force is applied to both of the clamper main body 1 and the lid body 2 in the direction in which the clamper main body 1 and the lid body 2 separate from each other. However, in the disk clamper 100 of this embodiment, the clamper main body 1 and the lid body 2 do not separate from each other, because the coupling strength between the clamper main body 1 and the lid body 2 can be sufficiently high as described below.

That is, during the above described assembling and disassembling processes of the disk clamper 100, only the locking claws 14 deform. The engaging claws 13 of the clamper main body 1 and the engaging claws 23 of the lid body 2 (required to have a high coupling strength) do not deform. Thus, it becomes possible to increase the areas of the mating surfaces on the engaging claws 13 and 23 (i.e., surfaces on which the engaging claws 13 and 23 contact each other), so that the engaging claws 13 and 23 do not easily disengage from each other. Moreover, because the engaging claws 13 and 23 are not required to deform, the peripheral walls 12 and 22 can be made thick, and each of the peripheral walls 12 and 22 can have an annularly continuous structure without slits or the like. Therefore, each of the peripheral walls 12 and 22 can have a structure which hardly deform in the radial direction, with the result that the engaging claws 13 and 23 do not easily disengaged from each other. As described above, according to the disk clamper 100 of this embodiment, it is possible to enhance the coupling strength of the clamper main body 1 and the lid body 2, and to prevent the separation of the clamper main body 1 and the lid body 2 even when the above described impact is applied to the clamper main body 1 and the lid body 2 due to the dropping or the like.

If torque (i.e., rotational force) is applied to the clamper main body 1 and the lid body 2, and if the torque is large enough to cause the resilient deformation of the locking claws 14, the engaging claws 13 and 23 may disengage from each other by the relative rotation of the clamper main body 1 and the lid body 2, with the result that the clamper main body 1 may separate from the lid body 2. However, in the disk drive device, the clamper main body 1 and the lid body 2 rotate in the same direction. Therefore, the only rotational force applied to the clamper main body 1 and the lid body 2 corresponds to a difference in rotational force (a product of a moment of inertia and an angular acceleration about the rotation axis) between the clamper main body 1 and the lid body 2 caused by the rapid acceleration or deceleration when the rotation starts or stops. As there is a small difference in moment of inertia between the clamper main body 1 and the lid body 2, the rotational force that may cause the deformation of the locking claws 14 of the clamper main body 1 does not generate. Thus, the clamper main body 1 and the lid body 2 do not separate from each other.

As described above, according to Embodiment 1, the peripheral wall 22 of the lid body 2 is fittable on the outside of the peripheral wall 12 of the clamper main body 1, and the engaging claws 13 and 23 engage each other in the axial direction when the peripheral walls 12 and 22 are in predetermined relative positions. Therefore, the clamper main body 1 and the lid body 2 can be integrated with each other by fitting the peripheral walls 12 and 22 to each other in a state where the circumferential positions of the engaging claws 13 and 23 are different from each other, and by rotating the peripheral walls 12 and 22 relative to each other until the engaging members 13 and 23 engage each other. Because it is not necessary to resiliently deform the engaging claws 13 and 23, it is possible to increase the areas of the mating surfaces of the engaging claws 13 and 23, and the peripheral walls 12 and 22 can be thicker, with the result that the coupling strength between the clamper main body 1 and the lid body 2 can be enhanced. Thus, it is possible to prevent the separation of the clamper main body 1 and the lid body 2 from each other even when the impact force is applied to the disk drive device due to the dropping of the disk drive device or the like.

Further, the engaging claws 13 and 23 do not deform when the disk clamper 100 is assembled or disassembled, and therefore the coupling strength between the engaging claws 13 and 23 does not decrease even when the disk clamper 100 is repeatedly assembled or disassembled, and therefore the damage of the component can be prevented.

Moreover, the relative rotation of the peripheral walls 12 and 22 is restricted by the engagement of the locking claws 14 of the clamper main body 1 and the grooves 24 of the lid body 2, and therefore the clamper main body 1 and the lid body 2 do not separate from each other unless the clamper main body 1 and the lid body 2 receive a rotational force enough to cause the deformation of the locking claws 14. Therefore, in the normal operation of the disk drive device, the clamper main body 1 and the lid body 2 are kept to be integrated with each other.

Moreover, because the locking claws 14 are formed on the base portion 10 of the clamper main body 1, the peripheral walls 12 and 22 can be made thicker, and each of the peripheral walls 12 and 22 can have an annularly continuous structure without slit or the like. Accordingly, it is possible to employ the structure in which the peripheral walls 12 and 22 hardly deform, with the result that the coupling strength between the clamper main body 1 and the lid body 2 can be further enhanced.

In addition, because the convex portions 21 are formed on the outer periphery of the lid body 2, it is possible to put a finger on the convex portion 21 to rotate the lid body 2 in the integration process of the clamper main body 1 and the lid body 2. Thus, the assembling operation can be easily performed without causing the slippage of the finger.

Additionally, because the engaging claws 13 and 23 of the clamper main body 1 and the lid body 2 are evenly spaced in the circumferential direction of the peripheral walls 12 and 22, it is possible to ensure the engagement between the clamper main body 1 and the lid body 2.

Embodiment 2.

Figure 13:
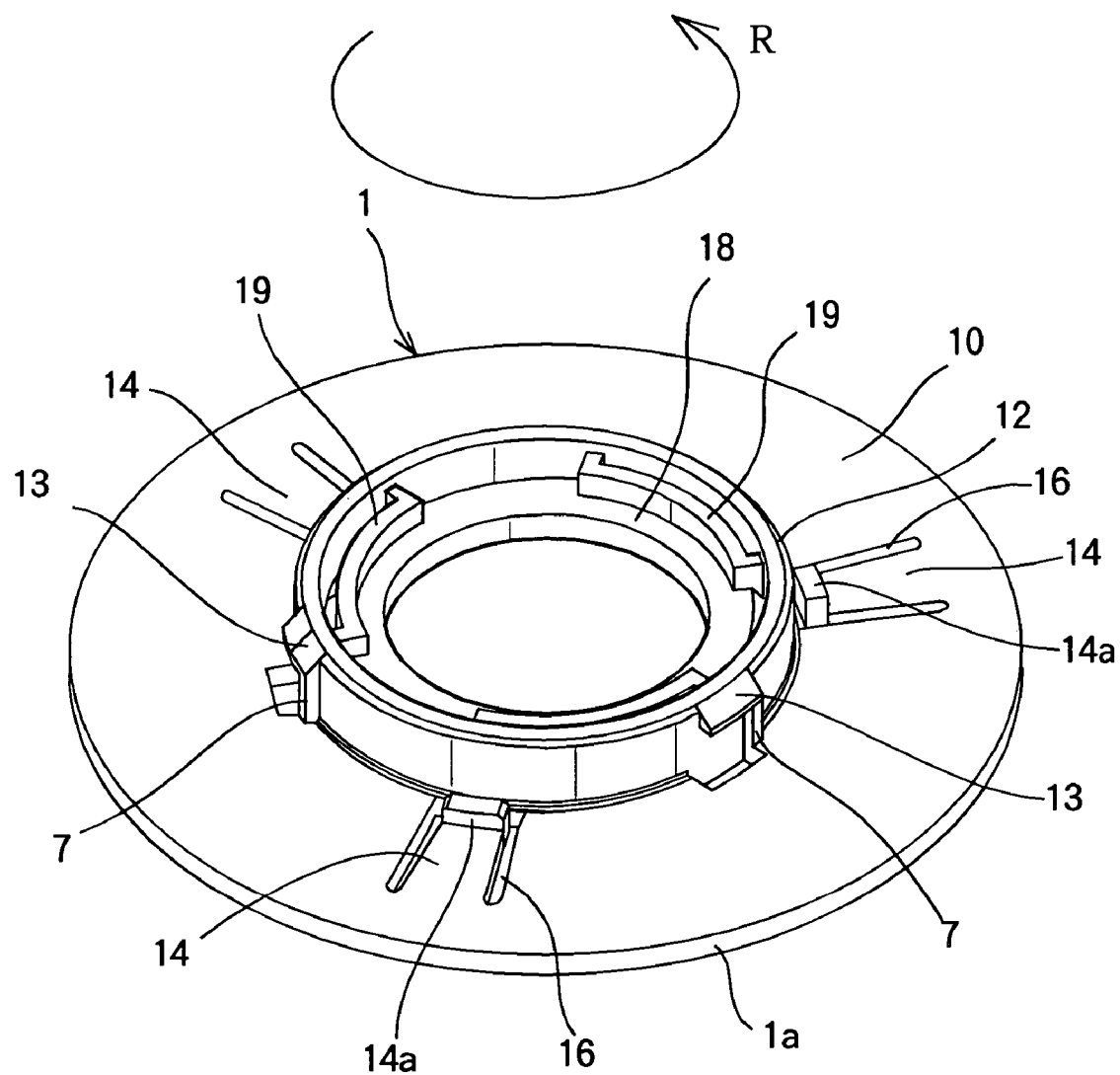
FIG. 13 is a perspective view of the disk clamper according to Embodiment 2 of the present invention.

FIG. 13 is a perspective view of a clamper main body 1 of a disk clamper according to Embodiment 2 of the present invention. In the disk clamper according to Embodiment 2, protrusions 7 are formed on the peripheral wall 12 of the clamper main body 1, each of which extends toward the base portion 10 from an end of each engaging claw 13 in the circumferential direction. The protrusions 7 function as stoppers (regulation means) that abut against the engaging claws 23 of the lid body 2 (FIG. 7). The other components are the same as those in Embodiment 1.

In order to integrate the clamper main body 1 and the lid body 2, the lid body 2 (FIG. 7) is rotated in the direction indicated by an arrow R in FIG. 13 with respect to the clamper main body 1 until the engaging claws 23 (FIG. 7) of the lid body 2 and the engaging claws 13 of the clamper main body 1 engage each other in the axial direction. In this state, the engaging claws 23 of the lid body 2 abut against the protrusions 7 formed on the ends of the engaging claws 13 of the clamper main body 1, so that the lid body 2 can not rotate further. As in Embodiment 1, in a state where the engaging claws 13 of the clamper main body 1 and the engaging claws 23 (FIG. 7) of the lid body 2 engage each other, the locking claws 14 of the clamper main body 1 engage the grooves 24 (FIG. 7) of the peripheral wall 22 of the lid body 2.

With such an arrangement, according to the disk clamper 100 of Embodiment 2, when the operator integrates the clamper main body 1 and the lid body 2 with each other, the operator only needs to pay attention to rotate the lid body 2 in one direction indicated by the arrow R in FIG. 13. Thus, it is possible to prevent the lid body 2 from being rotated more than necessary, and to prevent the insufficient engagement between the engaging claws 13 and 23.

In Embodiment 2, the protrusions 7 are continuously formed with the ends of the engaging claws 13. However, the protrusions 7 can be formed at separate positions from the engaging claws 13 as long as the protrusions 7 are disposed at positions where the protrusions 7 prevent the lid body 2 from being rotated more than necessary.

Figure 14:
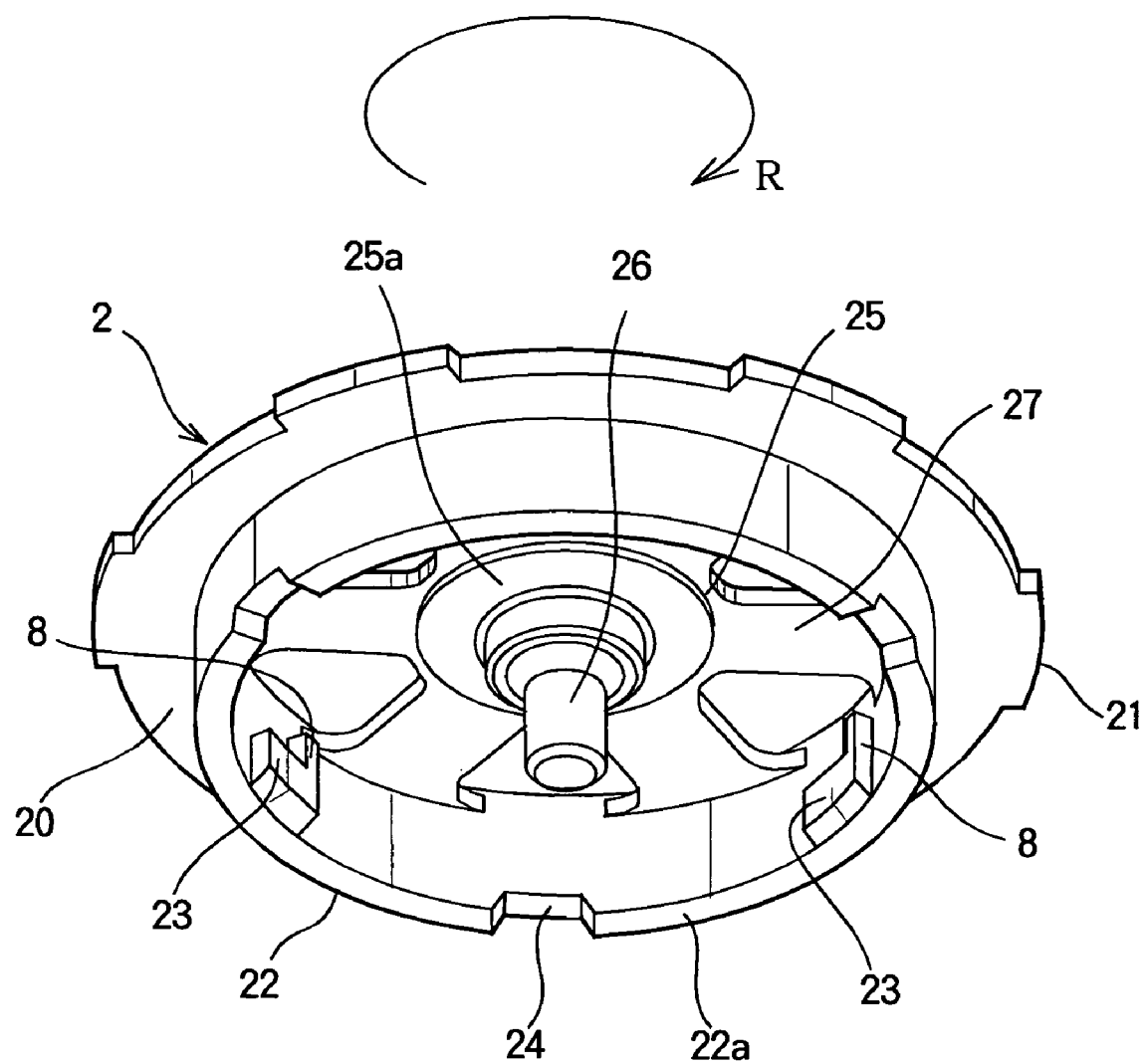
FIG. 14 is a perspective view of the disk clamper according to an modification of Embodiment 2 of the present invention.

FIG. 14 is a perspective view of a modification of Embodiment 2. In this modification, protrusions 8 are formed on the peripheral wall 22 of the lid body 2, each of which extends toward the ring shaped portion 20 from one end of each engaging claw 23. The protrusions 8 function as stoppers (regulation means) that abut against the engaging claws 13 of the clamper main body 1. The other components are the same as those in Embodiment 1.

In order to integrate the clamper main body 1 and the lid body 2, the lid body 2 is rotated in the direction indicated by an arrow R in FIG. 14 with respect to the clamper main body 1 (FIG. 4) until the engaging claws 23 of the lid body 2 and the engaging claws 13 (FIG. 4) of the clamper main body 1 engage each other. In this state, the protrusions 8 of the engaging claws 23 of the lid body 2 abut against the engaging claws 13 of the clamper main body 1, so that the lid body 2 can not rotate further. Therefore, it is possible to prevent the lid body 2 from being rotated more than necessary, and to prevent the insufficient engagement between the engaging claws 13 and 23.

In this modification, the protrusions 8 are formed continuously with the ends of the engaging claws 23. However, the protrusions 8 can be formed at separate positions from the engaging claws 23 as long as the protrusions 8 are disposed at positions where the protrusions 8 prevent the lid body 2 from being rotated more than necessary. Further, it is possible to provide both of the engaging claws 13 and 23 on the clamper main body 1 and the lid body 2.

In the above described Embodiments, the peripheral wall 22 of the lid body 2 is disposed outside the peripheral wall 12 of the clamper main body 1. However, it is alternatively possible that the peripheral wall 22 of the lid body 2 is disposed inside the peripheral wall 12 of the clamper main body 1. In this case, the attraction member 3 is held in the inside of the peripheral wall 22 of the lid body 2.

Further, in the assembling process of the disk clamper 100 of the above described Embodiments, the clamper main body 1 is fixed and the lid body 2 is rotated with respect to the clamper main body 1. However, it is possible that the lid body 2 is fixed and the clamper main body 1 is rotated with respect to the lid body 2. Additionally, although the clamper main body 1 has three engaging claws 13 and lid body 2 has three engaging claws 23, it is possible to provide any number of engaging claws 13 and 23.

Moreover, in the above described Embodiments, the grooves 24 are formed on the bottom end surface 22a of the peripheral wall 22 of the lid body 2, and the locking claws 14 are formed on the base portion 10 of the clamper main body 1. However, it is possible to form grooves on an end surface of the peripheral wall 12 of the clamper main body 1, and to form engaging claws on the ring-shaped portion 20 of the lid body 2. Furthermore, although the convex portions 21 are formed on the outer periphery of the lid body 2 in the above described Embodiments, concaves can be formed instead of the convex portions 21.

In the description of the above Embodiments, the terms "upper", "lower", "upper end", "upper surface", "lower end" and "lower surface" are used for the convenience of description. These terms do not limit the orientation of the assembled device or the device being assembled. For example, it is possible to constitute the device in such a manner that the "upper end" in the above description is directed downward or directed aside.

The invention claimed is:

1. A disk clamper comprising:
a clamper main body including a base portion having a contact surface that contacts a disk, and a first peripheral wall provided on a side of said base portion opposite to said contact surface;
a lid body including a second peripheral wall attached to the inside or outside of said first peripheral wall; and
an attraction member made of a magnet or a magnetic body, said attraction member being held in the inside of said first or second peripheral wall,
wherein one peripheral wall of said first and second peripheral walls has a peripheral surface substantially in the shape of a cylindrical surface, and the other peripheral wall contacts said peripheral surface to thereby be fitted to the inside or outside of said one peripheral wall, and wherein said clamper main body and said lid body include separate first and second engaging mechanisms, wherein said first and second peripheral walls respectively have first and second engaging members that form said first engaging mechanism and that engage each other in an axial direction of said peripheral surface when said first and second peripheral walls are in predetermined relative positions in a circumferential direction of said peripheral surface; and wherein said main body and said second peripheral wall have respectively first and second locking members, separately located from said engaging members, that form said second engaging mechanism and lock each other in a circumferential direction.

2. The disk clamper according to claim 1, wherein said second engaging mechanism further comprising comprises a locking means that locks said second peripheral wall relative to said first peripheral wall when said first and second peripheral walls are in said predetermined relative positions in said circumferential direction.

3. The disk clamper according to claim 2, wherein said locking means includes:

a groove formed on an end surface of said second peripheral wall or an end surface of said first peripheral wall; and a resilient member formed on said clamper main body or said lid body so that said resilient member faces said groove and said resilient member is able to engage said groove.

4. The disk clamper according to claim 1, wherein said first engaging member protrudes from said first peripheral wall toward said second peripheral wall, and said second engaging member protrudes from said second peripheral wall toward said first peripheral wall.

5. The disk clamper according to claim 1, wherein a plurality of said first engaging members are evenly spaced in said circumferential direction of said first peripheral wall, and a plurality of said second engaging members are evenly spaced in said circumferential direction of said second peripheral wall.

6. The disk clamper according to claim 1, wherein said lid body has a convex portion or a concave portion at an outer periphery thereof.

7. The disk clamper according to claim 1, further comprising a regulation means that regulates a movement of said second peripheral wall with respect to said first peripheral wall in one direction in said circumferential direction when said first and second peripheral walls are in said predetermined relative positions.

8. The disk clamper according to claim 7, wherein said regulation means includes a first stopper provided on said first peripheral wall of said clamper main body, and said first stopper is able to contact said second engaging member of said lid body.

9. The disk clamper according to claim 7, wherein said regulation means includes a second stopper provided on said second peripheral wall of said lid body, and said second stopper is able to contact said first engaging member of said clamper main body.

10. The disk clamper according to claim 1, wherein said first or second engaging member has a contact surface that contacts said peripheral surface.

11. The disk clamper according to claim 1, wherein the second peripheral wall extends a distance perpendicular to a base portion of the lid body.

12. The disk clamper according to claim 1, wherein the first and second engaging mechanisms are separately located from each other on the main body and lid body.

13. A method for assembling a disk clamper, said method comprising the steps of:

preparing a clamper main body and a lid body, said clamper main body including a base portion having a contact surface that contacts a disk, and a first peripheral wall provided on a side of said base portion opposite to said contact surface, said lid body including a second peripheral wall attached to the inside or outside of said first peripheral wall, one peripheral wall of said first and second peripheral walls having a peripheral surface substantially in the shape of a cylindrical surface, and the other peripheral wall contacting said peripheral surface to thereby be fitted to the inside or outside of said one peripheral wall, wherein said clamper main body and said lid body include a first and second engaging mechanisms said first and second peripheral walls respectively having first and second engaging members that form said first engaging mechanism and that engage each other in an axial direction of said peripheral surface when said first and second peripheral walls are in predetermined relative positions in a circumferential direction of said peripheral surface wherein said main body and said second peripheral wall have respectively first and second locking members, separately located from said engaging members, that form said second engaging mechanism and lock each other in a circumferential direction;

mounting an attraction member made of a magnet or a magnetic body in the inside of said first or second peripheral wall;

fitting said first and second peripheral walls to each other in a state where positions of said first and second engaging members in said circumferential direction are different from each other; and rotating said first and second peripheral walls relative to each other in said circumferential direction until said first and second engaging members engage each other.

* * * * *